United States Patent
Chillar et al.

(10) Patent No.: US 8,360,711 B2
(45) Date of Patent: Jan. 29, 2013

(54) APPARATUS AND METHOD FOR PRESSURIZED INLET EVAPORATIVE COOLING OF GAS TURBINE ENGINES

(75) Inventors: Rahul Jaikaran Chillar, Greenville, SC (US); Douglas Scott Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 1171 days.

(21) Appl. No.: 11/843,060

(22) Filed: Aug. 22, 2007

(65) Prior Publication Data

US 2009/0053040 A1 Feb. 26, 2009

(51) Int. Cl.
*F01D 1/00* (2006.01)

(52) U.S. Cl. .............................. 415/1; 415/117; 62/171

(58) Field of Classification Search .................. 415/115, 415/116, 117; 236/44 B; 62/121, 171, 259.4, 62/304
See application file for complete search history.

(56) References Cited

U.S. PATENT DOCUMENTS

| | | | | |
|---|---|---|---|---|
| 5,867,977 A * | 2/1999 | Zachary et al. | ............... | 60/39.53 |
| 5,930,990 A * | 8/1999 | Zachary et al. | ............... | 60/39.53 |
| 6,019,820 A * | 2/2000 | Leverett | ............... | 95/216 |
| 6,216,443 B1 * | 4/2001 | Utamura | ............... | 60/39.53 |
| 6,886,345 B2 * | 5/2005 | Ritland | ............... | 60/775 |
| 7,104,749 B2 * | 9/2006 | Frutschi | ............... | 415/1 |
| 7,104,750 B2 * | 9/2006 | Bolis et al. | ............... | 415/116 |
| 7,353,654 B2 * | 4/2008 | Bolis et al. | ............... | 60/775 |
| 7,353,655 B2 * | 4/2008 | Bolis et al. | ............... | 60/775 |
| 7,353,656 B2 * | 4/2008 | Bolis et al. | ............... | 60/775 |
| 7,520,137 B2 * | 4/2009 | Hoffmann et al. | ............... | 60/775 |
| 7,784,286 B2 * | 8/2010 | Bolis et al. | ............... | 60/775 |
| 2004/0103667 A1 * | 6/2004 | Frutschi | ............... | 60/775 |
| 2004/0105755 A1 * | 6/2004 | Bolis et al. | ............... | 415/116 |
| 2004/0255571 A1 | 12/2004 | Fetescue et al. | | |
| 2005/0279101 A1 * | 12/2005 | Hoffmann et al. | ............... | 60/775 |
| 2007/0059159 A1 * | 3/2007 | Hjerpe | ............... | 415/117 |

OTHER PUBLICATIONS

Chinese Office Action dated May 21, 2012 from corresponding Application No. 200810210022.5, along with unofficial English translation.

* cited by examiner

*Primary Examiner* — Edward Look
*Assistant Examiner* — Aaron R Eastman
(74) *Attorney, Agent, or Firm* — Cantor Colburn LLP

(57) ABSTRACT

An apparatus for cooling air for an intake to a gas turbine, is provided and includes a pressurized water piping and nozzle apparatus for producing a water spray in an airflow to the intake; and evaporative media for receiving the spray and causing a pressurizing of the air in the airflow.

14 Claims, 6 Drawing Sheets

APPARATUS AND METHOD FOR PRESSURIZED INLET EVAPORATIVE COOLING OF GAS TURBINE ENGINES

BACKGROUND OF THE INVENTION

1. Field of the Invention

The teachings herein relate to gas turbine engines, and in particular, to a pressurized evaporative cooler system for gas turbine inlet cooling.

2. Description of the Related Art

A typical evaporative cooling system for a gas turbine engine is located in an inlet filter house for the gas turbine and is situated downstream of filter elements. The function of the evaporative cooler system is to increase power output from the engine by cooling the inlet air to the machine through evaporation of water. A typical gas turbine evaporative cooler module includes: an outer evaporative cooler shell; evaporative cooling media pad; water distribution piping and a sump. Embodiments of water distribution and collection systems supply the media with water required for evaporative cooling. Some embodiments further include a drift eliminator system downstream of the evaporative cooler system to prevent any water carryover from the media into the gas turbine engine.

In a conventional evaporative cooler system water flows over the evaporative cooler media from the top of the media pad to the bottom. This water saturates the media from top to bottom. Ambient air that is filtered via inlet filters flows through the evaporative cooler media and thus the water evaporates. This causes the ambient air to cool prior to entering the turbine. Water that does not evaporate in the media trickles through the porous media pad and collects in the sump at the bottom of the media. This water is re-circulated through the media.

While use of an evaporative cooling system increases efficiency of the gas turbine, the placement of the system and other components in front of the inlet of the gas turbine causes a pressure drop that creates a load on the turbine.

Typical values of gas turbine intake pressure drop vary from one inch of water column to six inches of water column. This intake resistance reduces power output from a gas turbine. Typically, one inch of inlet pressure drop results in 1.0 to 2.0 MW power output losses for a commercial size gas turbine engine. If the pressure drop across the inlet filter house can be reduced then the gas turbine engine could generate greater power.

FIG. 1 depicts a typical prior art gas turbine intake filtration system with evaporative cooler module downstream of the filter elements. In addition, an illustration of the evaporative cooler media and side view of the evaporative cooler system is provided. The filtration module in front of the evaporative cooler typically includes a plurality of air filters.

FIG. 2 provides a three-dimensional (3D) view of a prior art evaporative cooler system with evaporative cooler media. Downstream of the media, the drift eliminators are shown which remove any water that potentially carries beyond the media. FIG. 3 is a high level schematic depicting aspects of the prior art evaporative cooling system showing a mechanism of water distribution, which is from the top onto the media. This illustration provides a detailed view of evaporative cooler media which shows water flow from the top and sideways airflow.

Accordingly, what are needed are techniques for providing inlet cooling to a gas turbine while limiting, reducing or eliminating the load created by prior art cooling systems, such as the techniques disclosed herein.

BRIEF DESCRIPTION OF THE INVENTION

In an embodiment, an apparatus for cooling air for an intake to a gas turbine, is provided and includes a pressurized water piping and nozzle apparatus for producing a water spray in an airflow to the intake; and evaporative media for receiving the spray and causing a pressurizing of the air in the airflow.

In another embodiment, a method for charging an intake of a gas turbine, is provided and includes: spraying water into an airflow upstream of the intake; and causing a pressurizing of air in the airflow.

In a further embodiment, an apparatus for increasing an output efficiency of a gas turbine is provided and includes means for pressurizing air at an intake to the gas turbine by spraying water into airflow for the intake.

BRIEF DESCRIPTION OF THE DRAWINGS

Referring now to the drawings wherein like elements are numbered alike in the several Figures, wherein.

DETAILED DESCRIPTION OF THE INVENTION

Disclosed herein is a pressurized evaporative cooling system for a gas turbine engine. The pressurized evaporative cooling system provides for improved performance over prior art evaporative cooling systems by at least one of limiting, reducing and eliminating load created by prior art cooling systems upon the gas turbine.

Figure 4:
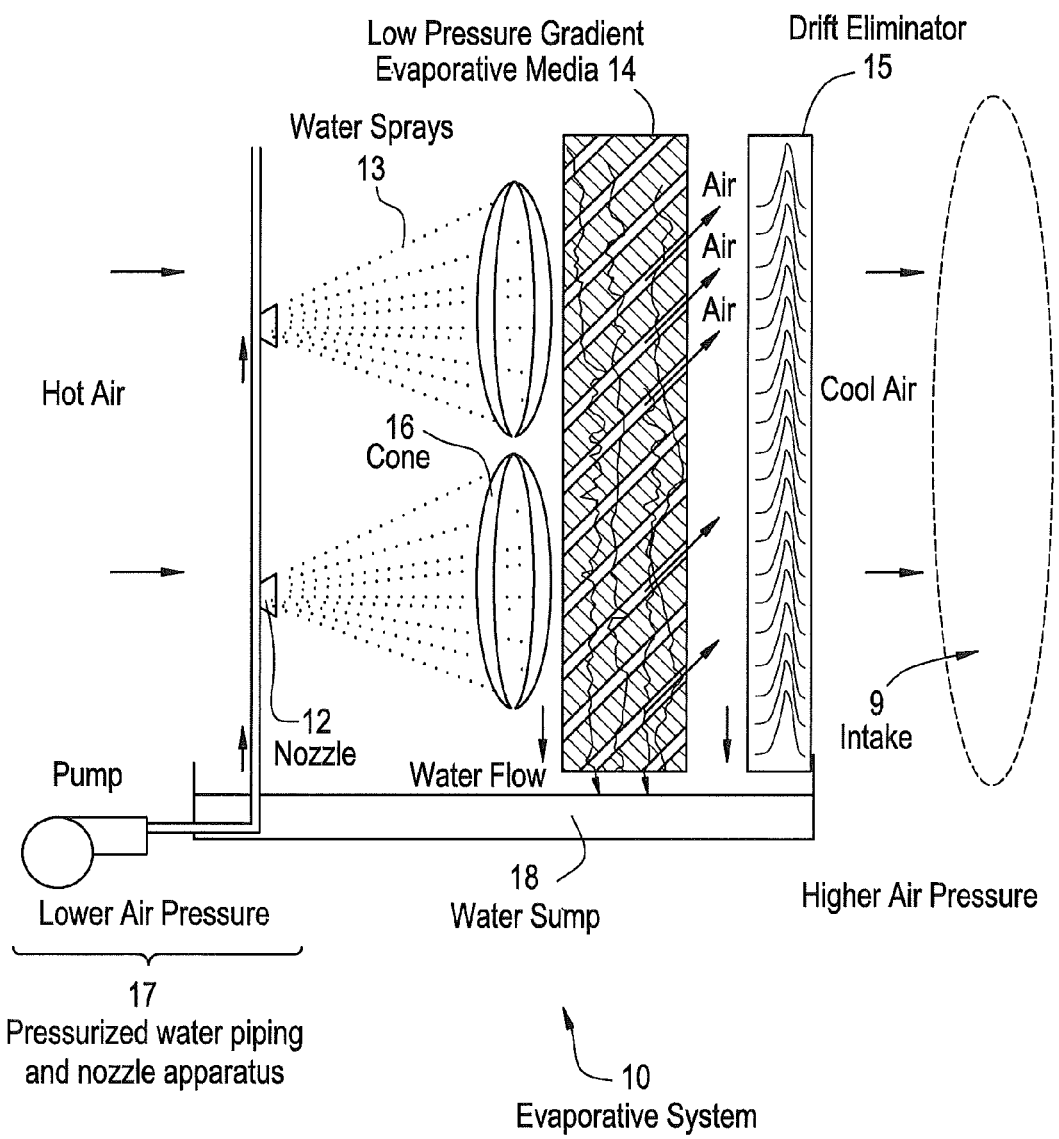
FIG. 4 provides an overview of an evaporative spray system according to the teachings herein.

Referring now to FIG. 4, there is shown an exemplary embodiment of the pressurized evaporative cooling system 10. Included in the pressurized evaporative cooling system 10 is a plurality of air charger water spray nozzles 12, each one for generating an air charger water spray 13. Each of the air charger water sprays 13 is directed into a low pressure gradient evaporative media 14. A drift eliminator 15 is included downstream of the low pressure gradient evaporative media 14. The drift eliminator provides for, among other things, prevention of water carryover from the low pressure gradient evaporative media 14 into an intake 9 of the gas turbine.

Water for evaporation is sprayed on the low pressure gradient evaporative media 14 using the nozzles 12. The spray water fans up and wets the media, causing the air to cool. In addition, spray water pushes intake air in the air stream toward the intake 9, thereby pressurizing the gas turbine inlet.

In FIG. 4, two cones 16 of water being sprayed from a pressurized water piping and nozzle apparatus 17 are shown. The pressurized water piping and nozzle apparatus 17 generally includes a pump, distribution piping, flow regulators, the nozzles 12 and other components useful for generating the water spray 13. The water spray 13 may be realized as the cones 16, or in some other form. In this embodiment, the cones 16 are sprayed into the air flow path in a direction of airflow onto the low pressure gradient evaporative media 14. When sprayed with water, the low pressure gradient evaporative media 14 saturates with the water, and as air flows over the media, this causes the air to cool and the cool air then enters the intake 9 of the turbine. In addition, the spray 13 of water pushes the air toward the intale 9. Accordingly, the air velocity and pressure both increase and result in improved efficiency in the gas turbine. Momentum from the water spray 13 is transferred, at least in part, from water fans to the air stream thus causing the increase in air pressure.

Design for the pressurized evaporative cooling system 10 may consider and take into account the desired degree of pressurization and any related characteristics.

The low pressure gradient evaporative media 14 is designed for cooperation with the spray system. For example, low pressure gradient evaporative media 14 provides improved pressure drop versus air velocity characteristics and better wetting capability. Thus, the amount of cooling achieved is increased. In the low pressure gradient evaporative media 14, both water and air flow in the direction of the intake 9. In some embodiments, water flows generally in the direction of the air flow, while excess water progress out of the media, such as downward (as may be realized by gravitational collection at the sump 18).

Figure 1A:
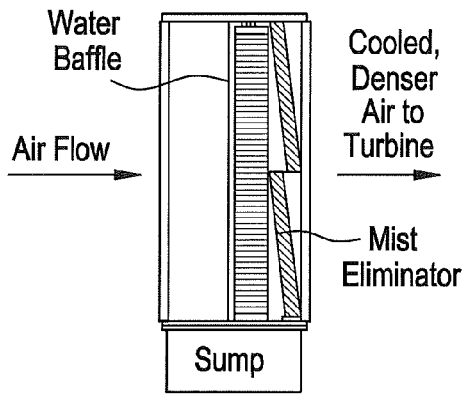
FIG. 1A, FIG. 1B and FIG. 1C, collectively referred to herein as FIG. 1, depict aspects of a prior art evaporative cooling system.
Figure 1B:
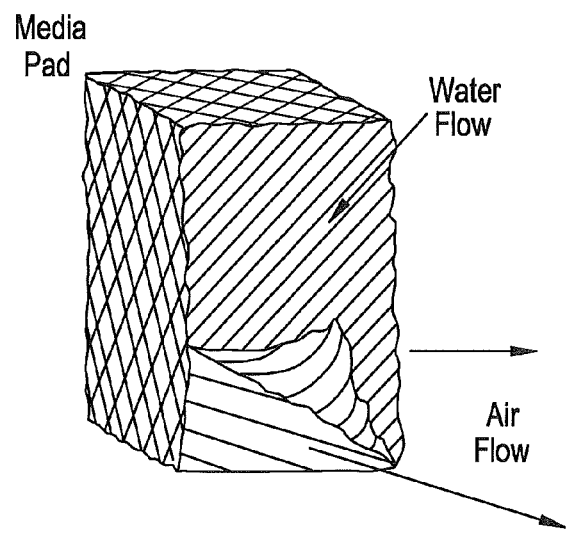
Figure 1C:
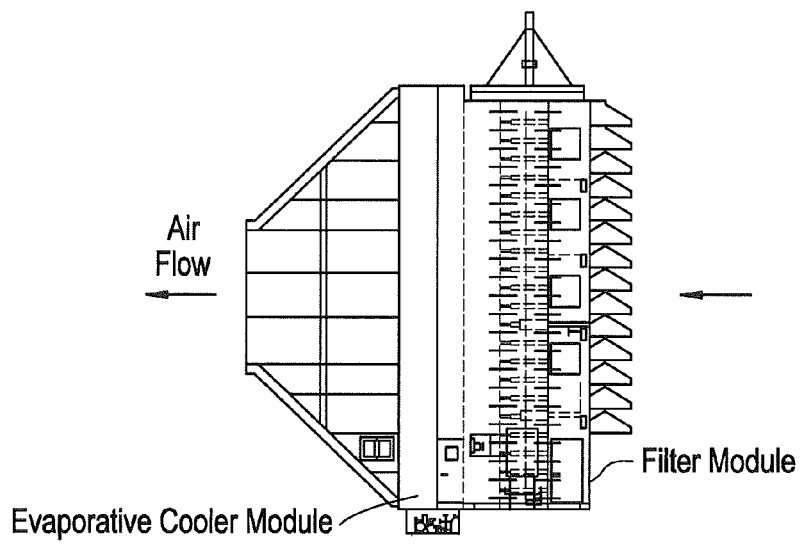
Figure 2:
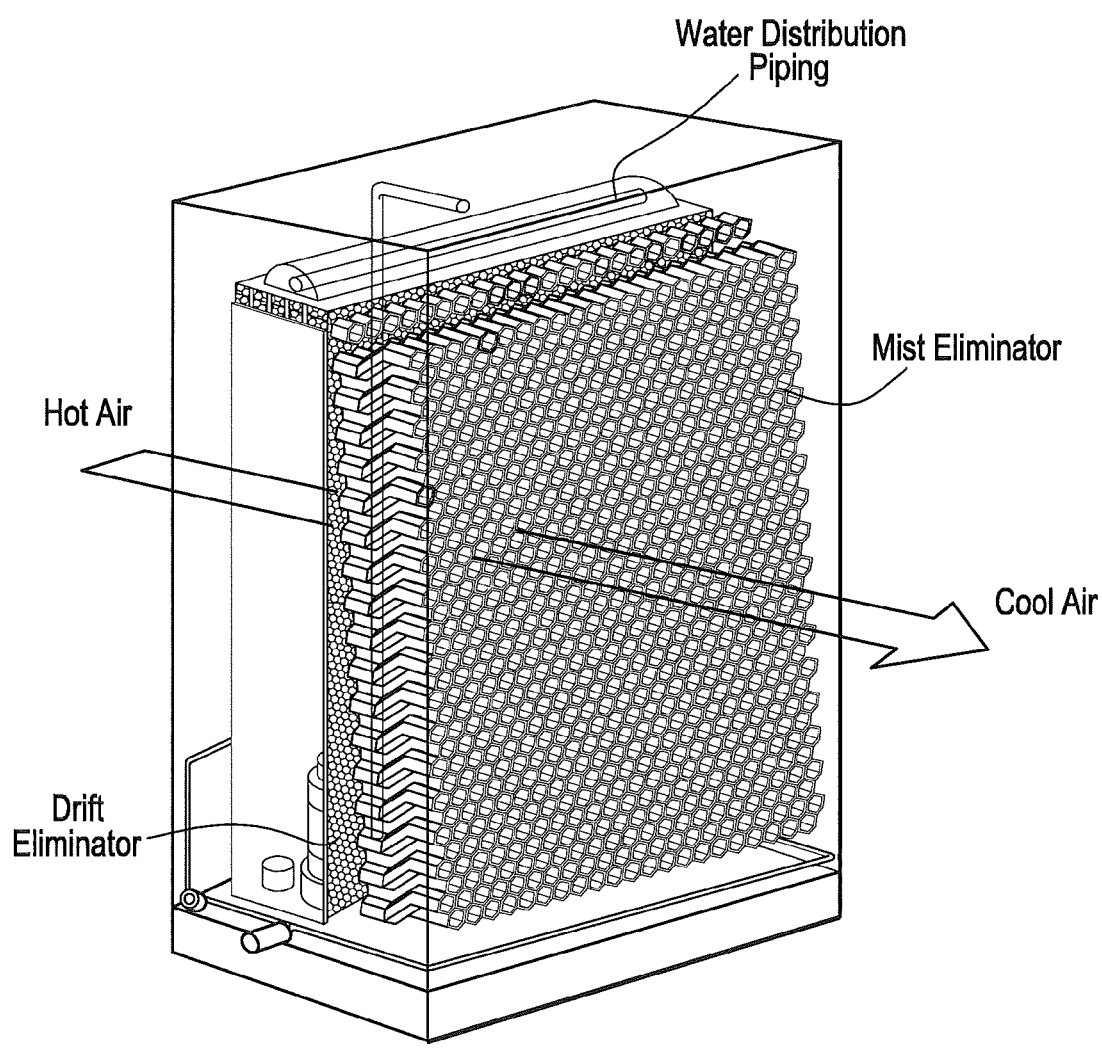
FIG. 2 and FIG. 3 further depict aspects of the prior art system of FIG. 1.
Figure 3:
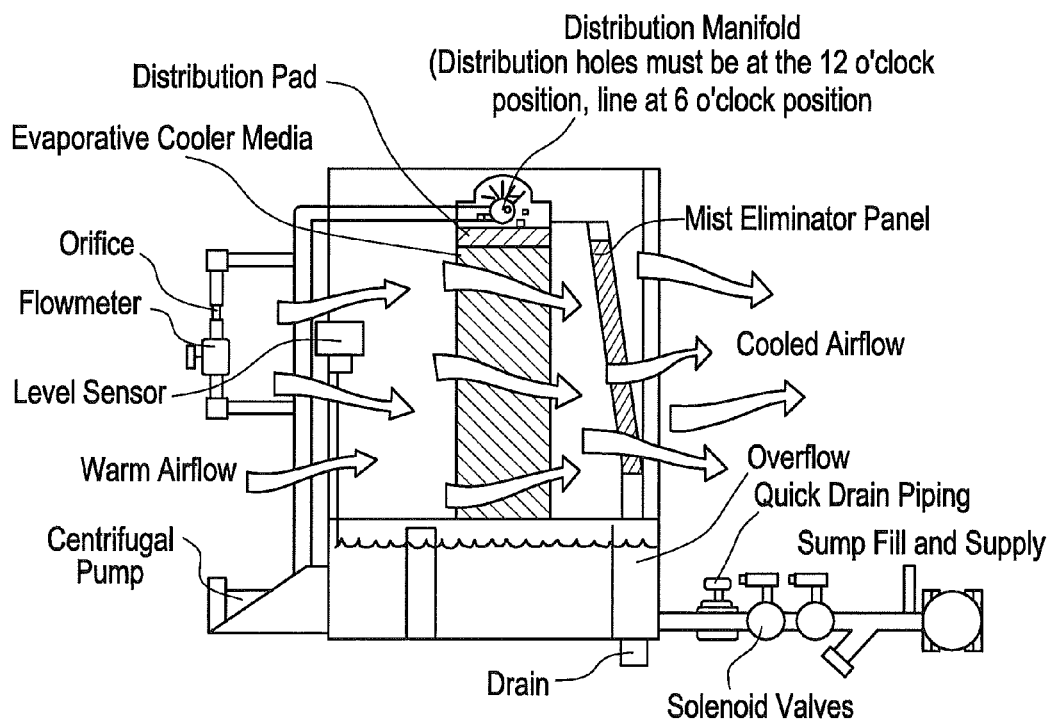

In contrast, for many prior art designs, water and air flow at various angles, typically in channels. Reference may be had to FIG. 1B, where water flows at a 45 degree down-angle and air flows at a 15 degree down-angle. This prior art design causes an increase in pressure drop with as velocity increases. As shown in FIG. 4, the problem of the prior art is eliminated by the media design provided herein. This problem is eliminated, at least in part, due to changes in air flow angles and water flow angles. However, the pressurized evaporative cooling system 10 may be operated using either one of these types of evaporative media, as well as other types that may be known in the art or later devised.

The teachings herein provide for reducing pressure drop in the evaporative cooling system 10 to provide "charging air" or "positive pressurization" for a gas turbine intake 9 leading to increased power from the gas turbine engine. The pressurizing at least partially compensates for suction at the intake created by the gas turbine. This results in increased power output and increased efficiency from the gas turbine engine. That is, the pumping energy consumed by the pressurized water piping and nozzle apparatus 17 is far less than the power augmentation obtained from the gas turbine engine by pushing the air into the turbine intake 9. Thus, an increased output from the gas turbine is realized.

For convenience, it is considered that the term "intake" includes all equipment as may be placed upstream of a compressor of the gas turbine. Such equipment may include, for example, silencer panels and a bleed heater. Accordingly, the term "intake" is not limited to an input to the compressor of the gas turbine.

The spray pattern of water or the water fan can be modified to push the air most effectively. That is, the spray pattern is not limited to conical sprays, convex sprays, water fans or other patterns disclosed herein.

Figure 5:
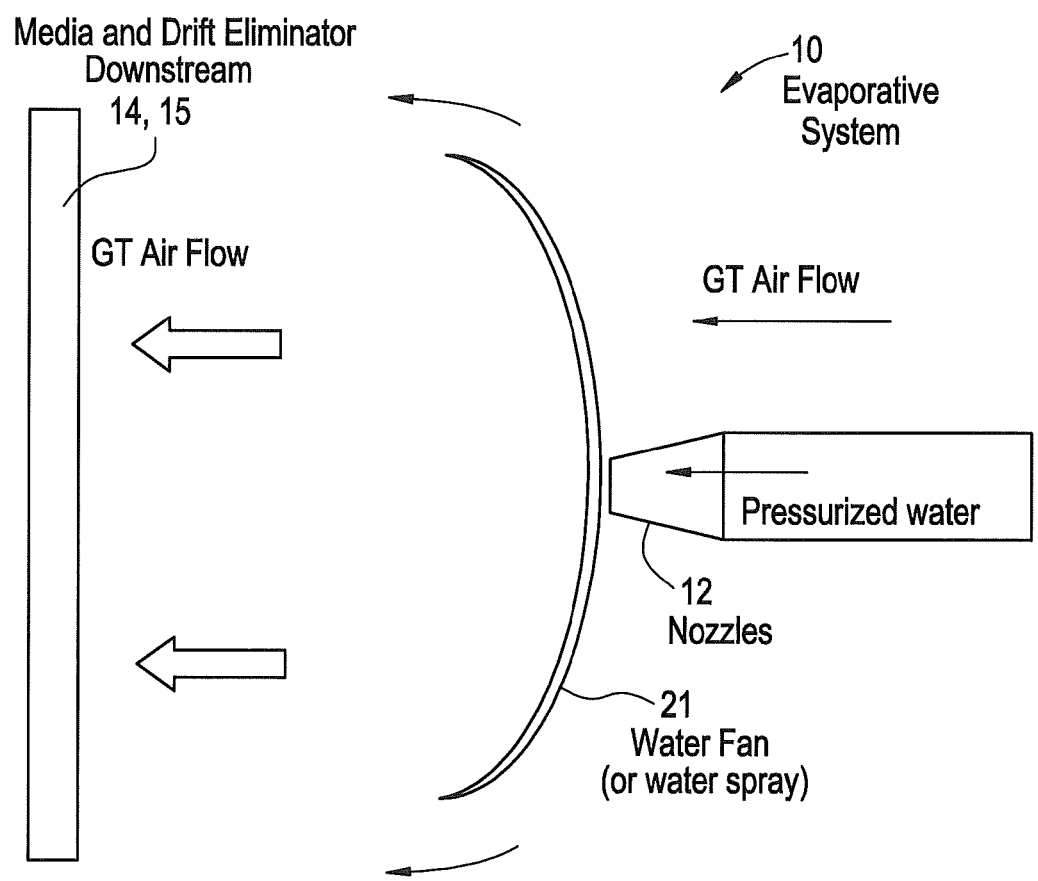
FIG. 5 depicts further aspects of the evaporative spray system of FIG. 4.

FIG. 5 shows a water fan 22 pushing air into the intake 9. As may be surmised, there can be multiple configurations of nozzles 12, water flow rate and nozzle water pressure to obtain the desired amount of pressure gain at the intake 9. The water fan 9 may be conical, convex (as depicted in FIG. 5), or take on any form deemed suitable.

In another embodiment, the pressurized evaporative cooling system 10 includes an air washer with water sprays. In addition to providing for other functions described herein, the downward spray washes out dirt and debris from influent air. It may be noted that in this embodiment, the spray is perpendicular to the airflow while generally parallel in some other embodiments. Accordingly, the spray may be provided at an angle, or combination of angles, wherein the spray is parallel, perpendicular or angled with relation to the airflow.

Figure 6A:
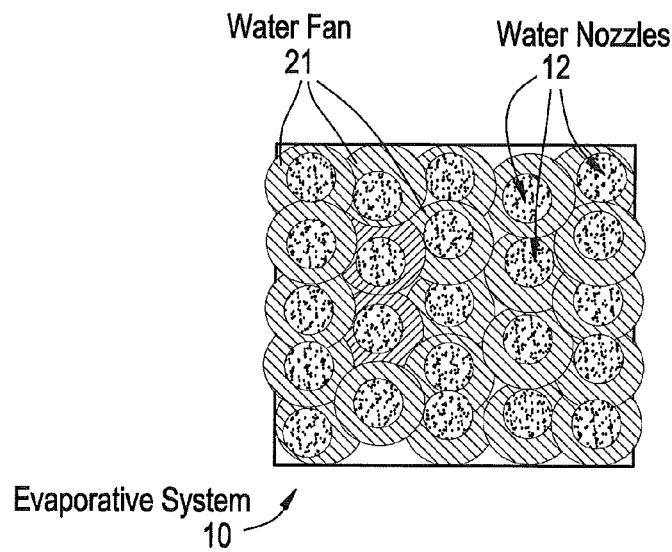
FIG. 6A and FIG. 6B, collectively referred to herein as FIG. 6, depict embodiments of spray patterns.
Figure 6B:
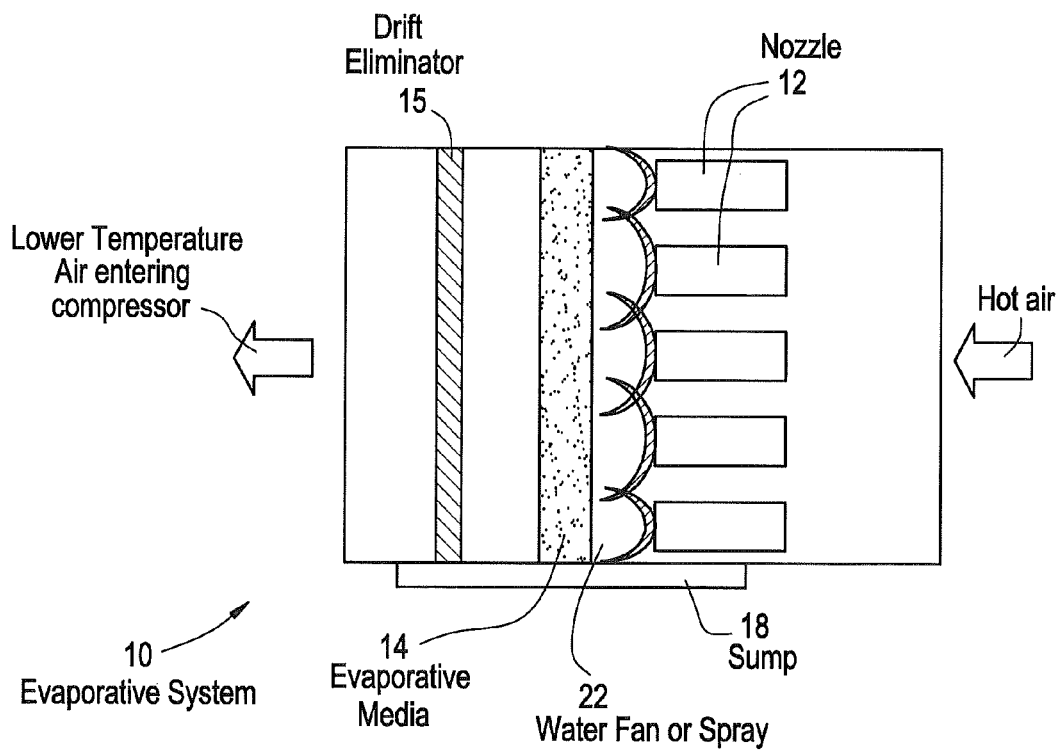

FIG. 6 depicts the pressurized evaporative cooling system 10 with water sprays 21 covering the entire face of a filter house. In FIG. 6A, the water sprays 21 onto the media 14 and the nozzles 12 are arranged across the face of the filter house. The geometry provides for complete coverage of media 14 of the evaporative cooling system 10. In FIG. 6B, a side view of the system of FIG. 6A is provided. In this illustration, hot air enters from the right of the filtration system and cools on passing through this evaporative cooling system 10 and then enters the compressor.

One will recognize that a variety of arrangements of media 14 and drift eliminators may be had. For example, the nozzles 12 are not limited to a single planar array, and may be deployed in multiple planar arrays, with intermediate deployments of at least one of media and drift eliminators.

Among the various advantages provided, the evaporative cooling system 10 provides for maintaining a filter house on a ground level; a smaller pipe filter house when compared with prior art designs; free power augmentation (for example, an 80% increase over a prior art saturation evaporative cooler); reduction in fouling as well as salts and contaminants, and improved filter life.

While the invention has been described with reference to an exemplary embodiment, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for cooling air for an intake to a gas turbine, the apparatus comprising:
   an evaporative media in the intake; and
   a nozzle upstream of the evaporative media configured to spray water into an airflow of the gas turbine intake in a direction of the airflow onto the evaporative media to pressurize the airflow at the evaporative media;
   wherein the evaporative media is configured to receive the airflow that has been pressurized by the water spray and evaporate the water spray from the pressurized airflow to cool the airflow.

2. The apparatus as in claim 1, wherein the evaporative media comprises a low pressure gradient evaporative media.

3. The apparatus as in claim 1, wherein water in the evaporative media flows in at least one of a direction of the airflow and a direction of gravity.

4. The apparatus as in claim 1, wherein the evaporative media comprises a media with channels producing flow at an up-angle.

5. The apparatus as in claim 1, further comprising at least one drift eliminator.

6. The apparatus as in claim 5, wherein the drift eliminator is disposed one of upstream and downstream of a nozzle in the pressurized water piping and nozzle apparatus.

7. The apparatus as in claim 5, wherein the drift eliminator limits water carryover into the intake.

8. The apparatus as in claim 1, further comprising a design for nozzles of the pressurized water piping and nozzle apparatus that produce one of a conical spray pattern, a convex spray pattern, an air washer and a water fan.

9. The apparatus as in claim 1, wherein the spray is at least one of parallel, perpendicular and angled with relation to the airflow.

10. A method for charging an intake of a gas turbine, the method comprising:
    spraying water into an airflow at the gas turbine intake in a direction of the airflow onto an evaporative media in the intake to pressurize the airflow, wherein the water is sprayed from a position upstream of the evaporative media;
    receiving the pressurized airflow at an evaporative medium; and
    evaporating the spray from the airflow at the evaporative medium to cool the airflow.

11. The method as in claim 10, wherein the pressurizing compensates for a suction pressure at the intake of the gas turbine.

12. The method as in claim 10, wherein spraying comprises at least one of creating a conical water spray, a water fan, an air washer and a convex water spray pattern.

13. The method as in claim 10, further comprising increasing an output of the gas turbine.

14. An apparatus for increasing an output efficiency of a gas turbine, the apparatus comprising:
    an evaporative media disposed at an intake to the gas turbine; and
    a pressurized water spray upstream of the evaporative media configured to pressurize an airflow at an intake to the gas turbine by spraying water into the airflow in a direction of the airflow onto the evaporative media;
    wherein the evaporative media is configured to receive the airflow pressurized by the water spray and evaporate the water spray from the airflow to cool the airflow.

* * * * *